(12) United States Patent
Iannace

(10) Patent No.: US 8,719,193 B1
(45) Date of Patent: May 6, 2014

(54) SYSTEMS AND METHODS FOR ANALYSIS AND LINKAGE BETWEEN DIFFERENT TRANSACTION DATA PROVIDERS

(75) Inventor: Marianne Iannace, North Salem, NY (US)

(73) Assignee: MasterCard International Incorporated, Purchase, NY (US)

( * ) Notice: Subject to any disclaimer, the term of this patent is extended or adjusted under 35 U.S.C. 154(b) by 237 days.

(21) Appl. No.: 13/106,680

(22) Filed: May 12, 2011

Related U.S. Application Data

(60) Provisional application No. 61/333,821, filed on May 12, 2010.

(51) Int. Cl.
*G06F 15/18* (2006.01)

(52) U.S. Cl.
USPC .......................................................... 706/12

(58) Field of Classification Search
USPC ............... 706/12, 45, 62; 705/26.1, 26.42, 35
See application file for complete search history.

(56) References Cited

U.S. PATENT DOCUMENTS

| 2002/0138432 | A1* | 9/2002 | Makino et al. ................... 705/43 |
| 2008/0177826 | A1* | 7/2008 | Pitroda ......................... 709/203 |
| 2010/0121807 | A1* | 5/2010 | Perrier et al. .................... 706/47 |
| 2010/0131443 | A1* | 5/2010 | Agarwal et al. ................. 706/46 |
| 2010/0138370 | A1* | 6/2010 | Wu et al. .......................... 706/12 |
| 2010/0169262 | A1* | 7/2010 | Kenedy et al. .................. 706/50 |

\* cited by examiner

*Primary Examiner* — David Vincent
(74) *Attorney, Agent, or Firm* — Buckley, Maschoff & Talwalkar LLC

(57) ABSTRACT

Systems, methods, means, computer program code and computerized processes include receiving a first set of de-identified transaction data from a first transaction data source, receiving a second set of de-identified transaction data from a second transaction data source, filtering the first and second sets of de-identified transaction data to identify transactions associated with at least a first entity and to create first and second filtered data sets, removing data associated with an identifier field for each of the transactions in the first filtered data set to created a de-identified first data set, removing data associated with an identifier field for each of the transactions in the second filtered data set to create a de-identified second data set, and processing the first and second de-identified data sets using a probabilistic engine to establish a linkage between data in each data set.

14 Claims, 6 Drawing Sheets

| # Hashed IDs | Hashed Group ID | Transaction Date | Transaction Time | Transaction Spend | Location ID | Frequency |
|---|---|---|---|---|---|---|
| A 100 | 1 | 8/1/2009 | xxx | $250 | Danbury | 2 |
| B 75 | 2 | 8/1/2009 | xxx | $200 | Stamford | 2 |
| C 50 | 3 | 8/2/2009 | xxx | $200 | Stamford | 4 |
| ... | ... | | | | | |
| X 1 | 97 | 8/1/2009 | 12:00 | $250 | Danbury | 1 |
| Y 1 | 98 | 8/1/2009 | 1:00 | $200 | Stamford | 1 |
| Z 1 | 99 | 8/2/2009 | 2:00 | $200 | Greenwich | 1 |

FIG. 4A

| # Merchant UIDs | Merchant Group ID | Transaction Date | Transaction Time | Transaction Spend | Location ID | Frequency |
|---|---|---|---|---|---|---|
| a 300 | 1 | 8/1/2009 | xxx | $250 | Danbury | 2 |
| b 150 | 2 | 8/1/2009 | xxx | $200 | Stamford | 2 |
| c 100 | 3 | 8/2/2009 | xxx | $200 | Stamford | 4 |
| ... | ... | | | | | |
| x 50 | 97 | 8/1/2009 | 12:00 | $250 | Danbury | 1 |
| y 10 | 98 | 8/1/2009 | 1:00 | $200 | Stamford | 1 |
| z 1 | 99 | 8/2/2009 | 2:00 | $200 | Greenwich | 1 |

FIG. 4B

|  | MasterCard Profile |  |  |  |  |  |
|---|---|---|---|---|---|---|
|  | A | B | C | X | Y | Z |
| a | 100% | | | | | |
| b | 80% | 100% | | | | |
| c | 60% | 80% | 100% | | | |
| x | 40% | 60% | 80% | 100% | | |
| y | 40% | 40% | 60% | 80% | 100% | |
| z | 40% | 40% | 40% | 60% | 80% | 100% |

Merchant Profile

FIG. 5

| # Hashed IDs | # Merchant UIDs | Pattern Match | Uniqueness Match | Direct Link | |
|---|---|---|---|---|---|
| A→a | 100 | 300 | 100% | 0.003% | 0.003% |
| B→b | 75 | 150 | 100% | 0.009% | 0.009% |
| C→c | 50 | 100 | 100% | 0.020% | 0.020% |
| ... | ... | ... | ... | ... | ... |
| X→x | 1 | 50 | 100% | 2% | 2% |
| Y→y | 1 | 10 | 100% | 10% | 10% |
| Z→z | 1 | 1 | 100% | 100% | 100% | REJECTED
| Z→y | 1 | 10 | 10% | 10% | 1% | ACCEPTED

FIG. 6

SYSTEMS AND METHODS FOR ANALYSIS AND LINKAGE BETWEEN DIFFERENT TRANSACTION DATA PROVIDERS

CROSS REFERENCE TO RELATED APPLICATIONS

The present application is based on, and claims benefit and priority of, U.S. Provisional Patent Application Ser. No. 61/333,821 filed on May 12, 2010, the contents of which are incorporated herein in their entirety for all purposes.

FIELD

Embodiments relate to transaction processing systems and methods. More particularly, embodiments relate to the matching and analysis of transaction data from different sources without exposing any personally identifiable information.

BACKGROUND

Payment processors, networks and other entities create and process large amounts of spending and payment-related data each day. The data is collected and stored to support transaction processing, and other purposes related to ensuring that parties involved in a transaction are properly compensated. The data has other potential uses as well, including for use in identifying and analyzing spending patterns and behaviors. However, when the payment data is used for such analysis purposes, it is important that the transaction details be "de-identified" from any private or personally identifiable information, or that strict limitations on use of and access to the data must be maintained.

It would be desirable to provide systems and methods which allow the analysis of large volumes of transaction data using de-identified data sets. Further, it would be desirable to provide a linkage method between data from one data source (such as a merchant's sales ledger) to transaction data from a second data source (such as a payment network), thereby providing an ability to construct analyses, reports and other applications based on the matched data sets.

BRIEF DESCRIPTION OF THE DRAWINGS

FIGS. 4A and 4B are block diagrams depicting data tables pursuant to some embodiments.

FIG. 5 is a block diagram depicting a matching table pursuant to some embodiments.

FIG. 6 is a block diagram depicting a portion of an example output analysis pursuant to some embodiments.

DETAILED DESCRIPTION

Figure 1:
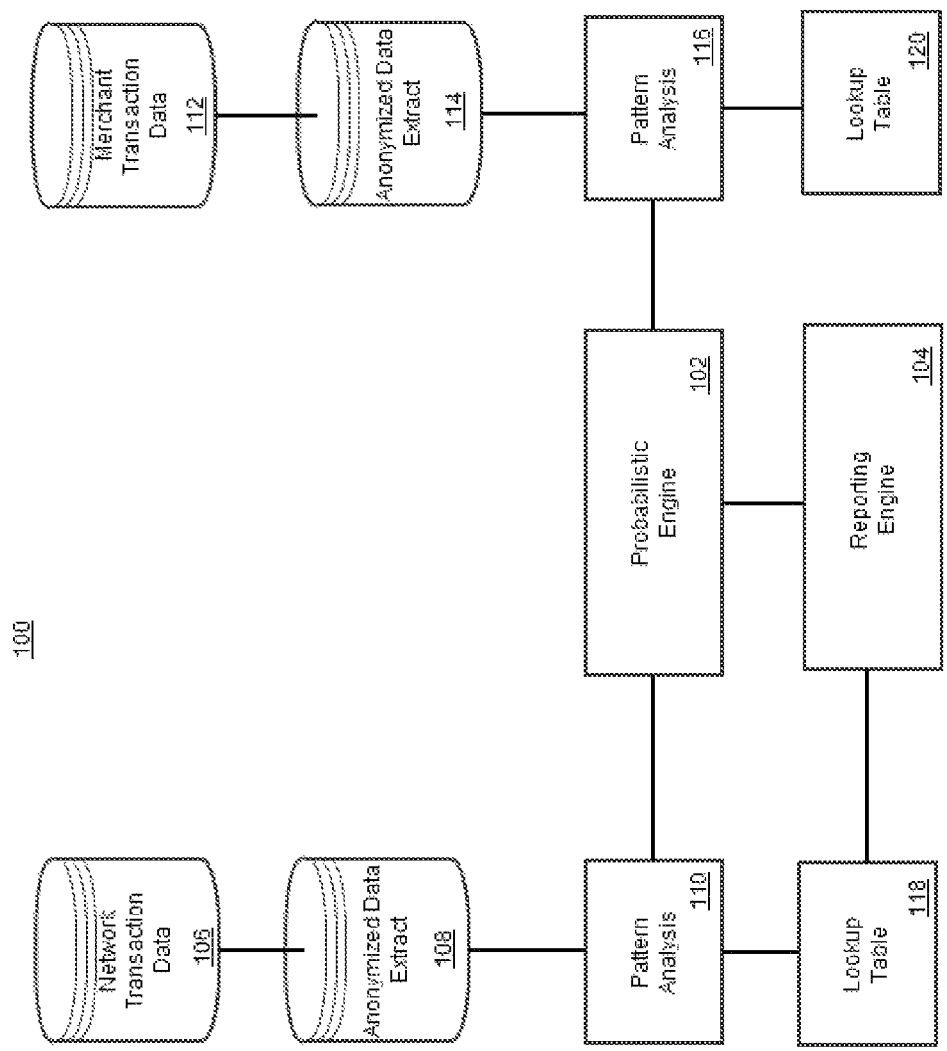
FIG. 1 illustrates a system architecture within which some embodiments may be implemented.

Embodiments of the present invention relate to systems and methods for analyzing transaction data. More particularly, embodiments relate to systems and methods for analyzing transaction data using data from a first transaction data provider (e.g., such as a payment card network) and data from a second transaction data provider (e.g., such as a merchant or group of merchants) in a way which ensures that personally identifiable information ("PII") is not revealed or accessible during or after the analysis.

A number of terms are used herein. For example, the term "de-identified data" or "de-identified data sets" are used to refer to data or data sets which have been processed or filtered to remove any PII. The de-identification may be performed in any of a number of ways, although in some embodiments, the de-identified data may be generated using a filtering process which removes PII and associates a de-identified unique identifier (or de-identified unique "ID") with each record (as will be described further below).

The term "payment card network" or "payment network" is used to refer to a payment network or payment system such as the systems operated by MasterCard International Incorporated, or other networks which process payment transactions on behalf of a number of merchants, issuers and cardholders. The terms "payment card network data" or "network transaction data" are used to refer to transaction data associated with payment transactions that have been processed over a payment network. For example, network transaction data may include a number of data records associated with individual payment transactions that have been processed over a payment card network. In some embodiments, network transaction data may include information identifying a payment device or account, transaction date and time, transaction amount, and information identifying a merchant or merchant category. Additional transaction details may be available in some embodiments.

Features of some embodiments of the present invention will now be described by first referring to FIG. 1 where a block diagram of portions of a transaction analysis system 100 are shown. The transaction analysis system 100 may be operated by or on behalf of an entity providing transaction analysis services. For example, in some embodiments, system 100 may be operated by or on behalf of a payment network or association (e.g., such as MasterCard International Incorporated) as a service for entities such as member banks, merchants, or the like.

System 100 includes a probabilistic engine 102 in communication with a reporting engine 104 to generate reports, analyses, and data extracts associated with data matched by the probabilistic engine 102. In some embodiments, the probabilistic engine 102 receives or analyzes data from several data sources, including network transaction data 106 (e.g., from payment transactions made or processed over a payment card network) and merchant transaction data 112 (e.g., from purchase transactions conducted at one or more merchants). The data from each data source 106, 112 is preprocessed before it is analyzed using the probabilistic engine 102. In some embodiments, the data is used to first create an anonymized data extract 108, 114 in which any PII is removed from the data. Pursuant to some embodiments, the anonymized data extract 108, 114 is created by generating a de-identified unique identifier code that is derived from a unique transaction identifier of each transaction in the source data 106, 112. For example, with respect to the network transaction data 106, a function may be applied to a transaction identifier associated with each transaction and transaction record to create a de-identified unique identifier associated with each transaction. In some embodiments, the function may be a hash function or other function so long as the unique identifier cannot by itself be linked to the individual transaction record (for example, an entity that has access to the anonymized data extract 108 is not able to identify any PII associated with a de-identified unique identifier in the extract 108).

The merchant transaction data 112 may be provided to an entity operating the system of the present invention via a secure file transfer (e.g., via sFTP or the like) and associated with a unique merchant identifier. The merchant transaction data 112 may include sales ledger data in a pre-defined format that contains information associated with a plurality of transactions conducted at the merchant including, for example, transaction date/time/spend, store location and a unique identifier associated with the transaction (such as, for example, a customer unique identifier). In some embodiments, the customer unique identifier ("UID") is selected such that it is not personally identifiable (although it may be personally identifiable with additional information known to the merchant). The customer UID, in some embodiments, is delivered using a de-identified unique identifier generated from the transaction data received from the merchant point of sale systems for continuity between transactions, and is selected to be persistent across transactions. For example, the customer UID may show up numerous times throughout a file provided by a merchant (e.g., the UID may be associated with transactions performed at different store locations, at different times, and with different transaction amounts). In some embodiments, the merchant data extract is tender agnostic, and includes transactions conducted with cash, payment cards, or the like. In general, the number of merchant transactions in the merchant data extract should be higher than the number of payment network transactions extracted by data extract 108 for the merchant as the merchant data extract includes transactions conducted with different tenders including payment network transactions.

Pursuant to some embodiments, the type of data extracted by modules 108, 114 depends on the type of information to be analyzed by the system 100. For example, the data extract 108 may be an extract of the same type of information to be provided by a merchant in data extract 114 (e.g., such as transaction date and time, transaction amount, store location and frequency data). In some embodiments, the data extract may be a sample of a larger set of data, or it may be an entire data set. Further, when extracting payment network data (at 108), information associated with the merchant for which an analysis is to be performed may be used to limit the extract. For example, if an analysis is to be performed for a specific merchant, the extract 108 may be limited to transactions performed at that specific merchant (including all locations or all locations in a specific geographical region). As a specific illustrative example, extract 108 may include a number of records of data, each including a de-identified unique ID, a transaction date, a transaction time, a transaction amount or spend, a store location identifier (identifying a specific store or merchant location), and an aggregate merchant identifier (identifying a specific merchant chain or top level identifier associated with a merchant). Those skilled in the art, upon reading this disclosure, will appreciate that other data fields may also be included depending on the nature of the analysis to be performed.

With respect to the data extract 114 of merchant transaction data 112, in some embodiments, the extract retrieves data elements including a customer UID, a transaction date, a transaction time, a transaction spend, and a store location ID (although those skilled in the art will appreciate that additional or other fields may be extracted depending on the nature of the analysis to be performed).

In some embodiments, the function or process of generating an anonymized data extract 108, 114 may be performed by an entity providing the data. For example, the anonymized data extract 108 may be generated by, or on behalf of, the payment association or the payment network and provided as an input or batch file to an entity operating system 100. As another example, the anonymized data extract 114 may be generated by, or on behalf of, a merchant (or group of merchants) wishing to receive reports or analyses from the system 100.

The system 100 also includes pattern analysis modules 110, 116. Pattern analysis modules 110, 116 may include data, rules or other criteria which define different patterns identified for analysis. Each pattern may be identified by a unique pattern identifier which may be, for example, a random number. Each pattern may be a unique pattern of date/time/spend, store location, and transaction frequency (or other combinations of data for which pattern analysis is desired). The pattern analysis modules 110, 116 may be code or applications which are designed for pattern analysis or may be part of an analysis system or module.

In use, pattern analysis module 110 generates a file, table or other extract of data that is used as an input to the probabilistic engine 102 and which is based on the anonymized and extracted network transaction data. The pattern analysis module 110 may be operated to generate a file, table or other extract of data that includes a number of transactions filtered by an aggregate merchant identifier (e.g., a group of transactions associated with a particular merchant or retail chain across different stores or locations). The module 110 may also summarize and profile the data by each unique combination of transaction date/time/spend, location, and frequency. A new profile identifier may be assigned for each pattern, and the data provided for input to the probabilistic engine 102 may have the de-identified unique ID removed before provision to the engine 102. In some embodiments, the removed unique ID and the assigned profile identifier may be stored in a separate lookup table 118 for later use by the reporting engine 104.

The pattern analysis module 116 generates a file, table or other extract of merchant transaction data that is used as an input to the probabilistic engine 102 and which is based on the anonymized and extracted merchant transaction data provided by module 114. The pattern analysis module 116 may be operated to generate a file, table or other extract of data which has been cleansed to ensure standard formatting of the merchant data for use by the probabilistic engine 102. The cleansing may include the removal of any unnecessary data provided by the merchant. For example, in one specific embodiment, the merchant data may be cleansed to remove all fields other than a customer UID, a transaction date, a transaction time, a transaction spend, and a location ID. The pattern analysis module 116 may further operate to summarize the data by UID to ascertain a frequency of transactions in the merchant data file, and to further summarize and profile data by each combination of transaction date/time/spend, location, and frequency. Upon generation of the extract, a new merchant profile identifier may be assigned to the extract. The merchant profile identifier and the UID are removed from the file output from the pattern analysis module 116. A separate lookup table 120 may be created to store the dropped UID and the merchant profile identifier for later use by the reporting engine 104.

Pursuant to some embodiments, the probabilistic engine 102 operates to perform an inferred match analysis to assess the inferred linkage for uniqueness and direct linkage. This allows further assurance of anonymity and avoids use of any PII. Pursuant to some embodiments, a uniqueness probability is derived from the relationship between the number of unique IDs for the Network Profile and the unique Merchant Profiles. As the probability of a direct link, (driven by uniqueness), approaches 100%, the risk of divulging or revealing some PII increases. For data analysis to identify product or marketing effectiveness, a pattern match of 100% is ideal. However, as the uniqueness of the match approaches 0%, the product or marketing effectiveness decreases significantly. By using features of the present invention to identify the uniqueness probability using anonymized transaction data, embodiments allow marketers, product developers, and analysts to identify trends or actual patterns and to adjust marketing, product development and other features accordingly.

In general, as used herein, the term "direct linkage" refers to the relationship between the probability match and the uniqueness probability. 100% "direct linkage" occurs when the probability match is 100% and the uniqueness probability is 100%. To avoid potentially revealing PII, in some embodiments, it may be desirable to reject any matches where there is 100% direct linkage. Pursuant to some embodiments, the primary inferred match is those records having the highest probabilities within a predetermined acceptance range.

Pursuant to some embodiments, the output of the processing performed by system 100 may be an analysis or report which is generated by the reporting engine 104. To facilitate the reporting and to ensure that PII is not divulged, the reporting engine may use the lookup tables 118, 120 to assign each de-identified merchant profile (from table 120) to one network profile (from table 118). This ensures that the de-identified customers remain de-identified.

As used herein, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. In addition, entire modules, or portions thereof, may also be implemented in programmable hardware devices such as field programmable gate arrays, programmable array logic, programmable logic devices or the like or as hardwired integrated circuits.

In some embodiments, the modules of FIG. 1 are software modules operating on one or more computers. In some embodiments, control of the input, execution and outputs of some or all of the modules may be via a user interface module (not shown) which includes a thin or thick client application in addition to, or instead of a web browser.

Figure 2:
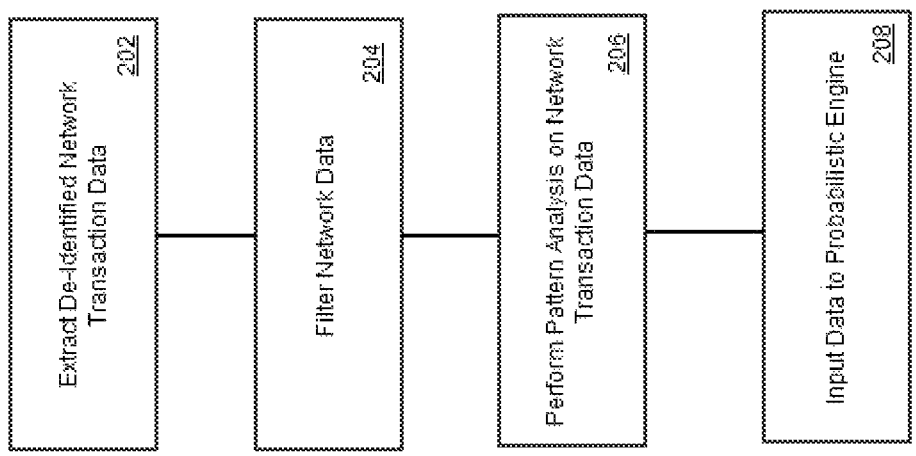
FIG. 2 is a flow diagram depicting a process pursuant to some embodiments.
Figure 3:
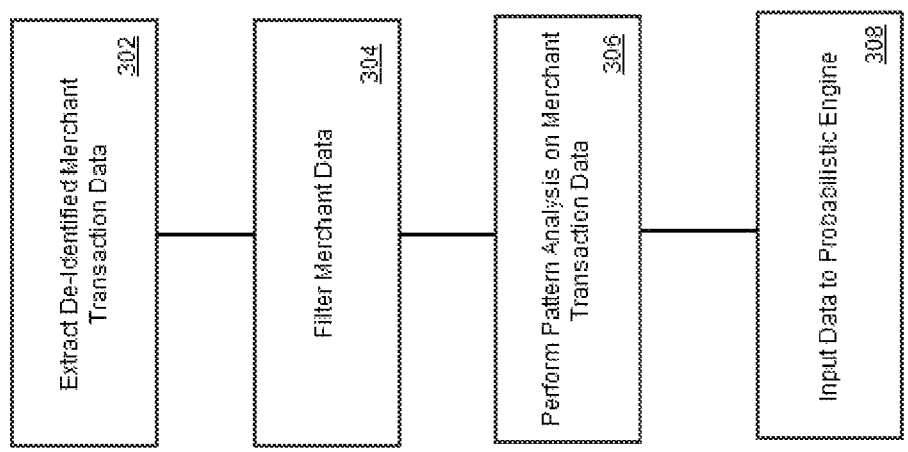
FIG. 3 is a flow diagram depicting a process pursuant to some embodiments.

Reference is now made to FIGS. 2-3 which are flow diagrams depicting processes 200, 300 for operating the system 100 of FIG. 1 pursuant to some embodiments. Some or all of the steps of the processes 200, 300 may be performed using under control of the system 100 and may include users or administrators interacting with the system via one or more user devices (not shown).

In the process 200, network transaction data is extracted from a transaction datastore 106 and a pattern analysis is performed to produce a file for input to probabilistic engine 102. The process 200 begins at 202 where a payment network data extract is performed to provide de-identified data from the payment network associated with a particular merchant or group of merchants. The de-identified data extract may include an extract of fields for payment network transactions, including: a de-identified unique ID (generated as described above), an aggregate merchant ID, a transaction date, a transaction time, a transaction spend, and a location ID. In the case where the payment network is the network operated by MasterCard International Incorporated, the data extract will include a number of transactions conducted using MasterCard-branded payment cards.

Processing continues at 204 where the de-identified data extracted at 202 is filtered, producing a filtered output file having a number of transactions for a particular merchant or group of merchants, resulting in a file of payment network transactions conducted at those merchants and each including: a de-identified unique ID, a transaction date, a transaction time, a transaction spend, and a location ID.

Processing continues at 206 where a pattern analysis is performed to identify a frequency of transactions. The pattern analysis may result in the creation of a file including, for each transaction, a de-identified unique ID, a transaction date, a transaction time, a transaction spend, a location ID, and a frequency variable.

Processing continues at 208 where data is provided to the probabilistic engine 102 including a number of transactions each including a number of fields such as: transaction date, transaction time, transaction spend, a location ID, a frequency variable, and a profile ID. The profile ID is associated with an entry in a lookup table created to store the profile ID in association with the de-identified unique ID for each transaction. In this way, data may be input to the probabilistic engine 102 without any identifier (e.g., the de-identified unique ID is removed from the data input to the probabilistic engine 102, and instead a lookup is provided external to the probabilistic engine 102).

Similar processing is performed on the merchant data. For example, as shown in FIG. 3, a process 300 is performed which starts at 302 with the extraction of de-identified merchant data, including a number of transactions (across different tenders) conducted at the merchant. The transaction data includes: a customer UID, a transaction date, a transaction time, a transaction spend, a location identifier, and, in some embodiments, a tender flag (which identifies the form of tender used in each transaction).

The data extract from 302 is then filtered and cleansed at 304 to produce a data file including, for each transaction in the extract, a customer UID, a transaction date, a transaction time, a transaction spend and a location ID.

Processing continues at 306 where the filtered data from 304 is processed using a pattern matching system to derive frequency data associated with the filtered and extracted merchant data. The pattern matching causes the creation of a file having, for each transaction, a customer UID, a transaction date, a transaction time, a transaction spend, a location ID and a frequency variable. A portion of this data is provided as the merchant input to the probabilistic engine 102 at 308, including, for each transaction, a transaction date, a transaction time, a transaction spend, a location ID, a frequency, and a merchant profile ID. The merchant profile ID is associated with a lookup table that is created to associate the customer UID with the pattern or data output at 306. In this way, merchant transaction data may be input to the probabilistic engine 102 without any customer identifier (e.g., the customer UID is removed from the data input to the probabilistic engine 102, and instead a lookup is provided external to the probabilistic engine 102).

By providing such anonymized data to the probabilistic engine 102, a number of analyses and reports may be generated without revealing any PII or other sensitive information. For example, the probabilistic engine 102 may be operated to establish a linkage between a merchant's sales ledger and the de-identified payment network transaction data. The linkage is a probability score between the merchant data and the payment network transaction data based upon spending patterns provided by the merchant along with spending patterns observed in the payment network transaction data. The linkage, on its own, does not necessarily provide any intrinsic value; however, the inferred match is a necessary component to build out merchant applications by providing a link (on a transaction level) between a merchant data file and a payment network data file. As a result, merchants may enjoy the use of a number of analytic and modeling applications including the ability to generate aggregate reports, probability scores and model algorithms.

The two inputs provided to the probabilistic engine 102 include profiles at the network profile level (from pattern analysis 110) and profiles at the merchant profile level (from pattern analysis 116). The profiles may range in quantity of unique accounts (e.g., unique records associated with an account, or the like) from x to 1, and unique transactions from >x to 1.

An illustrative example of a portion of data associated with a network profile is shown in FIG. 4A, and FIG. 4B illustrates a portion of data associated with an example table showing a profile at the merchant profile level pursuant to some embodiments.

Pursuant to some embodiments, the probabilistic engine 102 operates to match the merchant profile data with the network profile data with some level of probability. The level of probability, as used herein, is referred to "the pattern match". The pattern match could range from 0 to 1 (i.e., 0 to 100%). In addition to the pattern match, the probability of uniqueness could range from 0 to 1.

Network profiles and merchant profiles are linked in a many-to-many fashion and given some level of probability for each pattern match (e.g., 100 network profiles and 100 merchant profiles result in 10,000 probabilities). The match may not be exact—for example, the network profile may say that the spending associated with a specific transaction involved a credit card payment, while the merchant record may have a profile that indicates that the transaction was a cash transaction. These discrepancies may be matched and assigned a match probability. The linking is not actual—instead, a probability match is assigned ranging from 0 to 1 for each combination of records. An illustration of the many-to-many pattern match is shown in FIG. 5. In the illustrative example of FIG. 5, a match analysis is shown associated with an analysis performed using the system of FIG. 1 where the network transaction data is from a specific payment network—the network operated by MasterCard International Incorporated. In the illustrative match shown in FIG. 5, a "MasterCard Profile A" matches to a "Merchant Profile a" with a probability of 100%. Further, "Profile B" matches to "Profile b" with a probability of 100%, and so forth, because the patterns are identical. Other combinations are not identical, and therefore have a match probability of less than 100%.

FIG. 6 illustrates an example output of the inferred match process pursuant to some embodiments. The probabilities and acceptance scores are purely for illustrative purposes and are not intended to be limiting. The output of the inferred match process may be produced or manipulated by the reporting engine 104 for use by other applications.

Pursuant to some embodiments, the operation of the system 100 may be based on several assumptions or rules to protect PII. Such assumptions or rules may include ensuring that the combined data set (including network data and merchant data) is not disclosed to the merchant, all applications are specific to a merchant and are not to be shared with other parties, algorithms or scores are created using matched data and no algorithm or score is created using single transaction matches.

Pursuant to some embodiments, the techniques described above may be used in conjunction with a number of different applications. For example, in one embodiment, an aggregated report is produced based on a merchant data file, with an inferred match modeling link to different merchant unique identifiers. In some embodiments, enhanced and aggregated reports may be produced, with inferred match links to merchant unique identifiers utilizing additional "SKU" data from the merchant (e.g., where the SKU level data is received in the merchant transaction data at 112). In some embodiments, data append services may be delivered at the de-identified merchant unique identifier level. Data may be produced as an aggregated metric/probability score. Further, pursuant to some embodiments, an algorithm may be provided designed to score a list outside of a payment network (e.g. for or about a merchant or other third party).

Thus, embodiments of the present invention allow merchants, networks, and others to accurately generate and investigate transaction profiles, without need for added controls to protect and secure PII. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims. Although a number of "assumptions" are provided herein, the assumptions are provided as illustrative but not limiting examples of one particular embodiment—those skilled in the art will appreciate that other embodiments may have different rules or assumptions.

Pursuant to some embodiments, systems, methods, means, computer program code and computerized processes are provided to generate inferred match or linkage between de-identified data in different transaction data sets. In some embodiments, the systems, methods, means, computer program code and computerized processes include receiving a first set of de-identified transaction data from a first transaction data source, receiving a second set of de-identified transaction data from a second transaction data source, filtering the first and second sets of de-identified transaction data to identify transactions associated with at least a first entity and to create first and second filtered data sets, removing data associated with an identifier field for each of the transactions in the first filtered data set to created a de-identified first data set, removing data associated with an identifier field for each of the transactions in the second filtered data set to create a de-identified second data set, and processing the first and second de-identified data sets using a probabilistic engine to establish a linkage between data in each data set.

What is claimed is:

1. A computerized method, comprising:
    receiving a first set of de-identified transaction data from a first transaction data source, the first set of de-identified transaction data having all personally identifiable information removed therefrom;
    receiving a second set of de-identified transaction data from a second transaction data source, the second set of de-identified transaction data having all personally identifiable information removed therefrom;
    filtering said first and second sets of de-identified transaction data to identify transactions in each of said first and second sets of de-identified transaction data associated with at least a first entity and to create first and second filtered data sets including the identified transactions;
    performing a pattern analysis on said data in said first filtered data set to identify a frequency of transactions in said first filtered data set;

removing data associated with an identifier field for each of said transactions in said first filtered data set and creating a first lookup table entry associating said data associated with the identifier field for each of said transactions in said first filtered data with a profile ID to create a de-identified first data set;

performing a pattern analysis of said data in said second filtered data set to identify a frequency of transactions in said second filtered data set;

removing data associated with an identifier field for each of said transactions in said second filtered data set and creating a second lookup table entry associating said data associated with the identifier field for each of said transactions in said second filtered data with a profile ID to create a de-identified second data set; and processing said first and second de-identified data sets based on the profile IDs of said first and second de-identified data sets using a probabilistic engine to establish a linkage between data in each data set, the linkage being a probability score representing a probability match between the first and second de-identified data sets.

2. The method of claim 1, wherein said removing data associated with an identifier field for each of said transactions in said first data set further includes:
creating the first lookup table.

3. The method of claim 1, wherein said removing data associated with an identifier field for each of said transactions in said second data set further includes:
creating the second lookup table.

4. The method of claim 1, further comprising:
generating at least a first report using a reporting engine based on said linkage data using a reporting engine.

5. The method of claim 1, wherein said first transaction data source is a merchant.

6. The method of claim 1, wherein said second transaction data source is a payment network.

7. The method of claim 1, wherein said first transaction data source is a merchant and said filtering includes filtering to identify transactions associated with said merchant.

8. A non-transitory medium having program instructions stored thereon, the medium comprising:
instructions to receive a first set of de-identified transaction data from a first transaction data source, the first set of de-identified transaction data having all personally identifiable information removed therefrom;

instructions to receive a second set of de-identified transaction data from a second transaction data source, the second set of de-identified transaction data having all personally identifiable information removed therefrom;

instructions to filter said first and second sets of de-identified transaction data to identify transactions in each of said first and second sets of de-identified transaction data associated with at least a first entity and to create first and second filtered data sets including the identified transactions;

instructions to perform a pattern analysis on said data in said first filtered data set to identify a frequency of transactions in said first filtered data set;

instructions to remove data associated with an identifier field for each of said transactions in said first filtered data set and creating a first lookup table entry associating said data associated with the identifier field for each of said transactions in said first filtered data with a profile ID to create a de-identified first data set;

instructions to perform a pattern analysis of said data in said second filtered data set to identify a frequency of transactions in said second filtered data set;

instructions to remove data associated with an identifier field for each of said transactions in said second filtered data set and creating a second lookup table entry associating said data associated with the identifier field for each of said transactions in said second filtered data with a profile ID to create a de-identified second data set; and instructions to process said first and second de-identified data sets based on the profile IDs of said first and second de-identified data sets using a probabilistic engine to establish a linkage between data in each data set, the linkage being a probability score representing a probability match between the first and second de-identified data sets.

9. The medium of claim 8, wherein said instructions to remove data associated with an identifier field for each of said transactions in said first data set further includes:
instructions to create the first lookup table.

10. The medium of claim 8, wherein said instructions to remove data associated with an identifier field for each of said transactions in said second data set further includes:
instructions to create the second lookup table.

11. The medium of claim 8, further comprising:
instructions to generate at least a first report using a reporting engine based on said linkage data using a reporting engine.

12. The medium of claim 8, wherein said first transaction data source is a merchant.

13. The medium of claim 8, wherein said second transaction data source is a payment network.

14. The medium of claim 8, wherein said first transaction data source is a merchant and said filtering includes filtering to identify transactions associated with said merchant.

* * * * *